June 17, 1930.  J. W. LIPPINCOTT  1,763,976
ENDLESS WATER COURSE
Filed Nov. 5, 1928
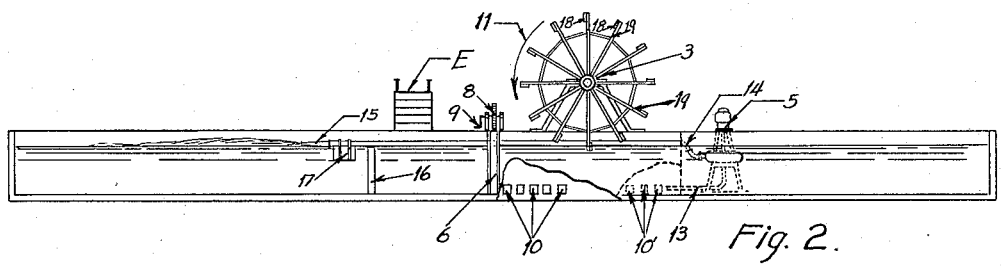
Fig. 2.
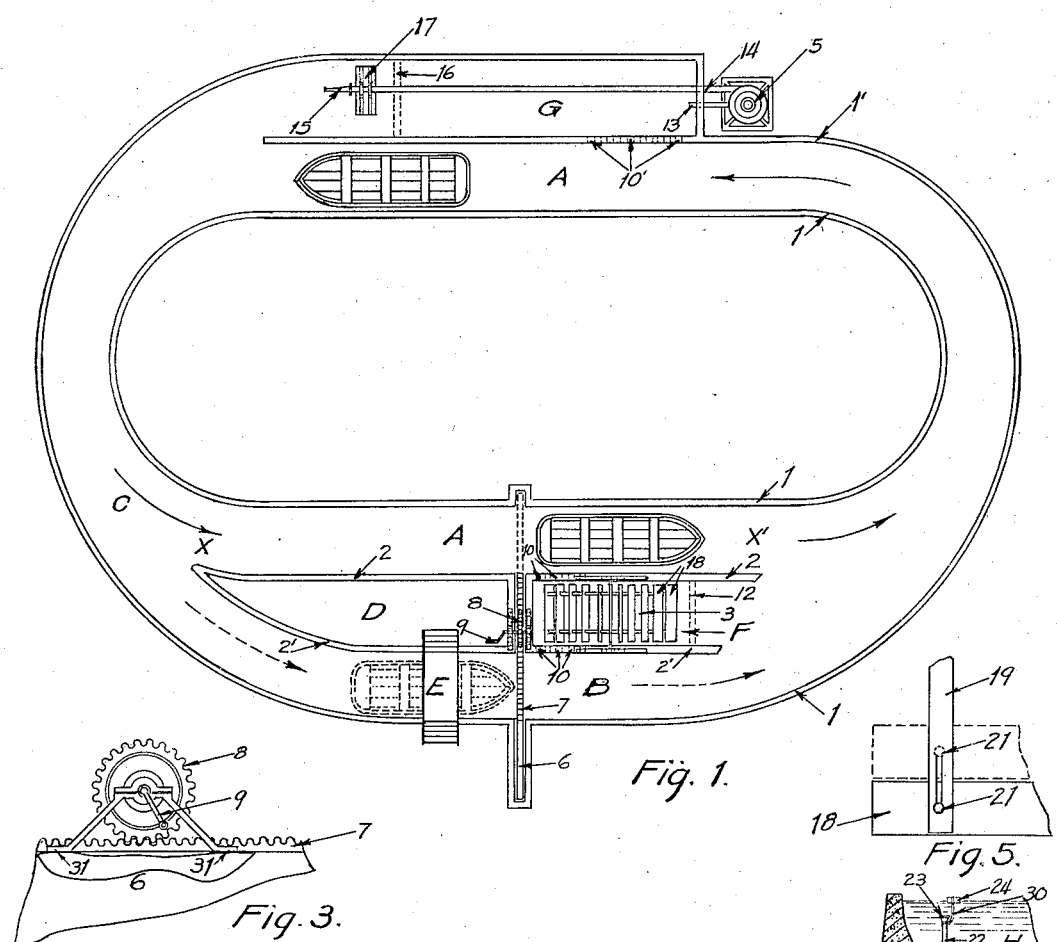
Fig. 1.
Fig. 3.
Fig. 5.
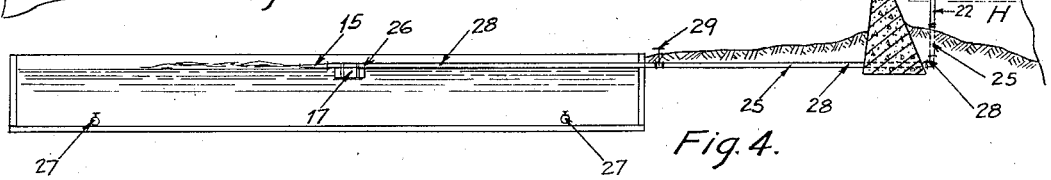
Fig. 4.
INVENTOR
BY John W. Lippincott Patented June 17, 1930

1,763,976

UNITED STATES PATENT OFFICE

JOHN W. LIPPINCOTT, OF LITTLE ROCK, ARKANSAS

ENDLESS WATER COURSE

Application filed November 5, 1928. Serial No. 317,414.

My invention relates to man made water courses and the object thereof is to enable bathers, boats and other objects to float round and round a water course comprising a main channel and a shunting channel, in either of which an endless stream (or current) may be mechanically produced, or it may be induced by a gravity flow of water in and throughout said water course, and subject to the will of an attendant by his manipulation of a gate caused to flow alternately throughout the main channel, or a portion of the main channel and the shunting channel, depending upon which of the channels is obstructed by said gate, and I attain this object and other objects by the means illustrated in the accompanying drawings, in which—

Fig. 1 illustrates a plan view of means to produce an endless stream of water in and throughout a main channel, and by manipulating a gate divert the stream through a shunting channel, and vice versa.

Fig. 2 is a side elevation of Fig. 1 with the walls removed, except segments of wall 1 and 2 in order to show ports through these walls.

Fig. 3 is a detail view of a gate shifting mechanism.

Fig. 4 is a side elevation of a modification of Figs. 1 and 2 wherein gravity is used in lieu of mechanical power.

Fig. 5 is a segmental detail front view of a means to automatically limit the depth of submergence of the blades of a water wheel.

Similar letters and numerals designate similar parts throughout the several drawings.

A designates a main channel between the walls 1 and 1' on the upper side of Fig. 1 and between the walls 1 and 2 on its lower side, throughout which an endless stream of water may be produced and maintained by rotating the water wheel 3 in the direction indicated by the solid arrow 11, or by actuating a pump 5, and the velocity of the current may be materially increased by actuating both at the same time.

Bathers, boats and other floating objects will follow the current round and round in the main channel until it is obstructed by the gate 6, which as shown in Fig. 1 is obstructing the shunting channel B. This gate is provided with a rack 7, which is engaged by a pinion 8, which is supported by a pedestal 31 and is provided with a crank 9.

The water does not of course flow through the shunting channel while it is obstructed by the gate, but when the operator in charge of the gate desires to stop any particular one or more of the bathers, boats, etc., he actuates the pinion 8 which slides the gate across, and obstructs the main channel A. As the shunting channel B will then be open (unobstructed) the current will be diverted to and through the shunting channel, and cease to flow between the points X and X' in the main channel, and the bathers, boats, etc., which are near but not past the diverting point C will float with the current into the shunting channel. When as many bathers, boats, etc., as desired are in the shunting channel the gate may be manipulated in the reverse direction and thereby reopen the main channel and again obstruct the shunting channel, and thereby trap the bathers, boats, etc., which happen to be in the shunting channel between the diverting point C and the gate, but the bathers, boats, etc., which have not reached the diverting point C will again float into the main channel.

The object in trapping bathers, boats, etc., in the shunting channel is to notify the bathers and occupants of the boats that it is time for them to get out and make room for others. When the outgoing patrons have been replaced the gate may be again manipulated to obstruct the main channel, and thereby open the shunting channel, which will divert the stream through the shunting channel and shunt the new patrons out into the main channel.

It is no doubt obvious that when either channel is obstructed by the gate there will be dead or standing water between the points X and X' in the obstructed channel while the current may flow freely through the other channel, hence either channel may be used for shunting and trapping.

Between the walls 2 and 2' is land D which is reached by a raised bridge E spanning the shunting channel, and a portion of this land is utilized to accommodate operators, patrons and spectators. Another portion of this land is utilized to accommodate a water wheel 3 positioned over a water wheel chamber F. This water wheel may be actuated by any suitable power. The front of this water wheel chamber is partly closed by a submerged wall 12. Ports 10 are provided near the bottom of the wheel chamber to connect the wheel chamber with each of the channels in order to let as much water into this chamber as is forced out by the rotation of the water wheel for making the endless stream of water.

A pump 5 is positioned over a pump chamber G and is provided with a suction (intake) line 13, and a discharge line 14 which terminates in a nozzle 15. The suction line connects with the pump chamber. The front end of this pump chamber is closed by a wall 16. This pump chamber is supplied with water to feed the pump through ports 10' near the bottom of and through the wall 1' which it uses in producing the endless current.

The object of closing the front ends of the wheel and pump chambers, and having the ports near the bottom of each is to prevent the flow of water from the surface into these chambers and thereby create eddies (suck holes).

I find from experience that the greatest efficiency from a nozzle discharge is obtained when the nozzle is positioned about a half inch above and parallel with the surface of the water in the channel. I have also observed that the depth of the water in the channel will vary with the number of the bathers and the occupants of the boats, etc., hence if the nozzle is in a fixed position it might be several inches above the surface when but few or not any people were in the course, and on the other hand it might be submerged several inches below the surface when many people are in it, and in either case materially decrease the efficiency of this current producing means, hence as another object of my invention I have adopted a float 17 to support the nozzle in the position of greatest efficiency. This float is composed of sheet cork or other floatable material, and will automatically rise and fall with the rise and fall of the water in the course, and thereby constantly maintain said nozzle at a predetermined level above the surface regardless of the variation of the depth of the water in the course.

The efficiency of the water wheel 3 is also subject to variation as the water rises and falls if the blades of said wheel are in fixed positions, hence I contemplate making them of material that will only sink to a predetermined depth of their own weight. These blades 18 are slidably connected to the spokes 19 as is shown in detail in Fig. 5, so that within the limits of the stops 21 and 21' they will automatically sink to a predetermined depth regardless of the rise or fall of the water in the course, that is, only a portion of the lower edge of each blade will be submerged.

In the modification illustrated by side elevation in Fig. 4 the water wheel 3 and the pump 5 may be dispensed with and the endless stream be produced in the endless water course, similar in shape to that illustrated by Fig. 1 by water flowing by gravity. In this case however a reservoir or other suitable source of water H must be enough higher than the course to supply the necessary water by gravity flow through a combination intake and discharge line 28 at such nozzle velocity as will produce a surface current of the desired velocity by manipulating the valve 29. This intake line comprises a hose 22 provided at its upper end with a strainer 23 to exclude fish, leaves and other objectionable matter incidental to water. This strainer is adjustably connected with the underside of a float 24 by a strap 30 so that the intake may submerge to a lower depth to take in cooler water during hot weather, or vice versa. The lower end of this hose is connected to a pipe 25 provided with the above mentioned intake valve 29. This pipe is connected with a discharge hose 26 which is provided with a discharge nozzle 15 like that hereinbefore referred to in connection with the pump 5. This nozzle rests upon a float 17, positioned as in Fig. 1. Underflow valves 27 are provided near the bottom of the course to let out as much water as flows in after the course is full enough, so as to prevent overflow, for if allowed to overflow the current will be diminished in proportion to the overflow, that is, when the overflow equals the inflow there will not be any current beyond the point of overflow.

Several combinations of the various current producing means illustrated and described herein may be used, e. g. several pumps 5 may be positioned side by side over the pump chamber G, or several gravity intake and discharge lines 28 may be substituted for all or any number of the pumps, and the water wheel 3 may or may not be used at the same time, or the water wheel may be removed and either or both pumps and gravity flow lines substituted.

While I consider four feet as ample depth for swimming, boating, wading etc., and not too deep to be reasonably safe, it may be deeper or shallower without affecting the power required to produce a current of given velocity, except that the air resistance and wall friction is greater at higher velocities, but as I only contemplate a velocity of from two to four miles per hour these resistances will be of little consequence. Also excepting these resistances the length of the course will be of little consequence so far as the power is concerned, as it will take but little more power to produce a given current in a course a mile long than it will in one only a hundred feet long, but it will take longer to get the surface to moving throughout the greater length, e. g. if only one current producing means is working and producing a current of four miles per hour it will take fifteen minutes to get the entire surface into motion. The width of the course is however of material consequence to the amount of power required, e. g. if a given volume of water at a given nozzle velocity will produce a current of four miles per hour in a course ten feet wide it will take twice the volume of water at the same nozzle velocity, or the same volume of water at twice the nozzle velocity to produce a four mile an hour current in a course twenty feet wide, hence there will be greater economy in constructing the course long and narrow, e. g. a course twenty feet wide and a quarter of a mile long will not accommodate any more patrons than a course ten feet wide and a half mile long, and it will only take about half as much power to operate the latter.

The shape of the course illustrated by Fig. 1 is of no particular significance, as it may be of almost any desired shape, even to a series of parallel flumes, each connected to another by return and reverse bends to make an endless main channel, as long as a shunting channel is connected with the main channel at points corresponding to X and X' in Fig. 1. In this case X will in effect correspond with the tail of a flume and X' will correspond with its head. A shunting gate will of course have to be positioned so that either channel may be obstructed while the other is open to permit of an endless stream therein and throughout said open channel.

It is no doubt obvious that this course may be used exclusively for boats and other floating amusement devices, or the boats etc. may be removed and the course used exclusively for bathers. In the latter case either channel may be kept obstructed as long as it is desired to cater exclusively to bathers, and two splendid pools of standing water will thereby be afforded, one being between the gate and the point X and the other between the gate and the point X', for the use of those who desire to swim, wade or otherwise amuse themselves in standing water. The current may of course be maintained in the unobstructed channel for the benefit of those who prefer the exhilerating thrills and excitement of speeding down stream.

The endless stream in the unobstructed channel will not be affected by the open ends of the shunting channel (or obstructed channel), as the water seems to bank up against the gate from each of the open ends of the pools thus formed, and the stream has no tendency to enforce a passage through the gate in either direction, i. e. the enforced current follows the natural law of flowing in the direction of least resistance, which in this case seems to be in the enforced direction, and flows past these open ends just as undisturbed as if said open ends were closed by gates or walls.

Having thus described my invention what I claim and desire protected by Letters Patent of the United States is—

1. The combination in an endless stream of a main channel with an interconnected and normally obstructed shunting channel, and means to open said shunting channel and at the same time obstruct the main channel, and thereby divert the stream into and through the shunting channel, and vice versa.

2. The combination in an endless stream of a main channel with an interconnected and normally obstructed shunting channel, and means to open said shunting channel and at the same time obstruct the main channel, and thereby divert the stream into and through the shunting channel for the purpose of trapping floating or swimming objects by again obstructing the shunting channel before said objects have reached the point of obstruction in the latter, and vice versa.

3. The combination in an endless stream, of a main channel, with an inter-connected and normally obstructed shunting channel, and a gate provided with a rack to be engaged by a pinion which when actuated will open the shunting channel and obstruct the main channel, and thereby divert the stream into and through the shunting channel, and vice versa.

4. In an endless water course provided with means to produce an endless stream of water therein by enforcing a horizontal stream of water to merge with and impart motion to the surface of said water course, the combination therewith of means to support and automatically maintain said stream producing means at its most efficient level regardless of the rise and fall of the water in said water course.

5. In an endless water course provided with a gravity flow of water, the combination therewith of a water intake line provided with a strainer adjustable as to depth submergence and attached to a float.

JOHN W. LIPPINCOTT.